Figure 1:
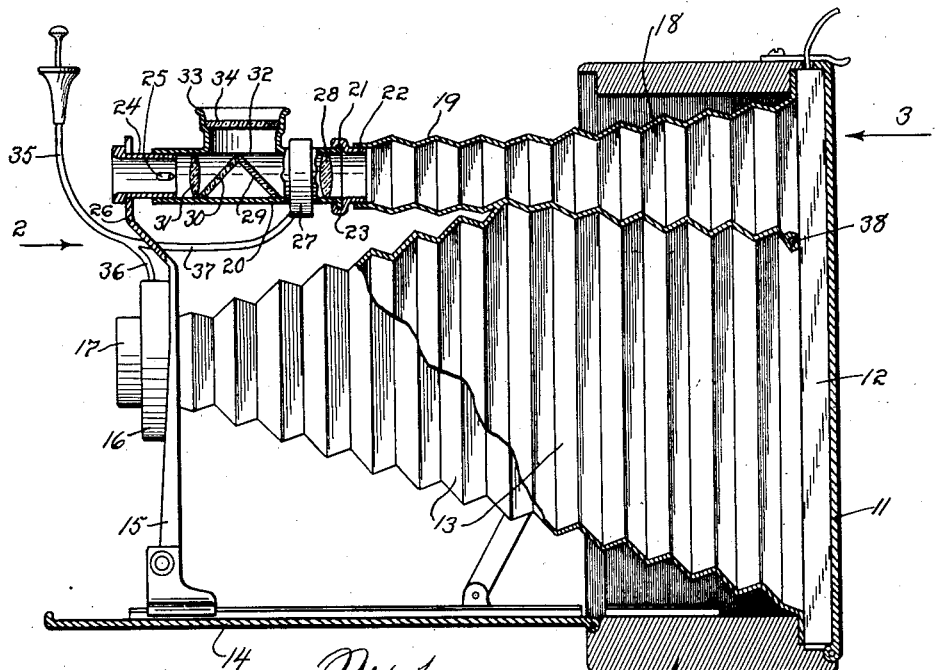

May 20, 1924.

E. J. VERSCHRAEGHEN

PHOTOGRAPHIC CAMERA

Filed April 3, 1922

1,494,724

2 Sheets-Sheet 1

WITNESS.
John B. Dade.

INVENTOR.
Emile J. Verschraeghen.
by Wilkinson & Giusta
his ATTORNEYS.

May 20, 1924.  1,494,724
E. J. VERSCHRAEGHEN
PHOTOGRAPHIC CAMERA
Filed April 3, 1922   2 Sheets-Sheet 2

INVENTOR.
Emile J. Verschraeghen.

WITNESS.
John B. Dade by Wilkinson & Giusta
his ATTORNEYS

Patented May 20, 1924.

1,494,724

UNITED STATES PATENT OFFICE.

EMILE J. VERSCHRAEGHEN, OF DENVER, COLORADO.

PHOTOGRAPHIC CAMERA.

Application filed April 3, 1922. Serial No. 549,054.

*To all whom it may concern:*

Be it known that I, EMILE J. VERSCHRAEGHEN, formerly a subject of the King of Belgium, but having now received my first papers for naturalization as a citizen of the United States, a resident of the city and county of Denver and State of Colorado, have invented certain new and useful Improvements in Photographic Cameras, of which the following is a specification.

This invention embodies improvements in photographic cameras and, although in some instances the broader invention may well be adapted for use in connection with cameras for animated photography, the improvements have been more especially devised with reference to the various forms of folding and box cameras, employing plates, film packs and film rolls, which types of cameras are commonly used by the public at large and also in commercial photography generally.

An amateur, or other photographer, and especially a vacationist or tourist is oftentimes desirous of having his or her own photograph appear in the picture with an individual, or a group, or other objects or scenes that are being taken, not only as evidence of his or her presence actually at the places where and when the pictures were taken, or as a means of identification with the object taken such as an automobile or other object, but also as a matter of general satisfaction in being included along perhaps with another or other members of a party, such as in travels, picnics or otherwise, and for many other obvious reasons.

To this end, therefore, there has already been devised means, whereby a timing mechanism is provided, and set after the picture has been focused, in order to allow the photographer also to get around in position in front of the camera before the timing mechanism causes the operation of the shutter and the exposure to be made; but obviously this has many drawbacks, is very unsatisfactory, and generally results in a defective or spoiled negative, owing to the probable shifting of positions or pose while waiting for the timing device to function.

The primary aim of the present invention, therefore, is to equip such a camera with positively controlled means, whereby the photographer may be included or omitted at will from the negative as desired.

Broadly speaking this is accomplished by the functioning of a smaller auxiliary camera appliance that is so uniquely combined with the main camera, in adjustable collapsible relation thereto but not merely as a miniature duplication thereof, as to provide for the projection of the face of the photographer, or other object, on a portion of the same negative vehicle for the main view, which said latter object is located at a position rearwardly of the main view and likewise rearwardly of the plane of the main objective lens or the front of the camera, whether that rearward position be above or to one side of the camera body.

It may be emphasized that the foregoing statement fully applies to the projection of any desired object or objects, even other than the face of the photographer, which are properly positioned rearwardly of the objective lens of the main camera.

Figure 2:
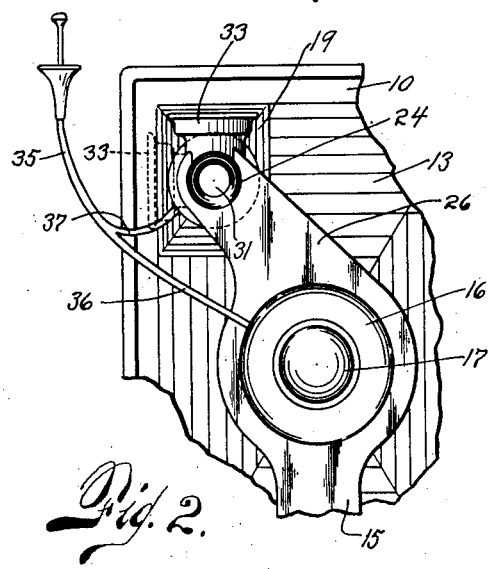
Figure 3:
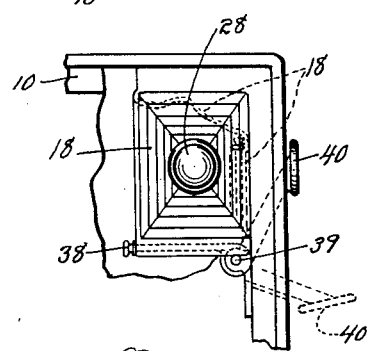
Figure 4:
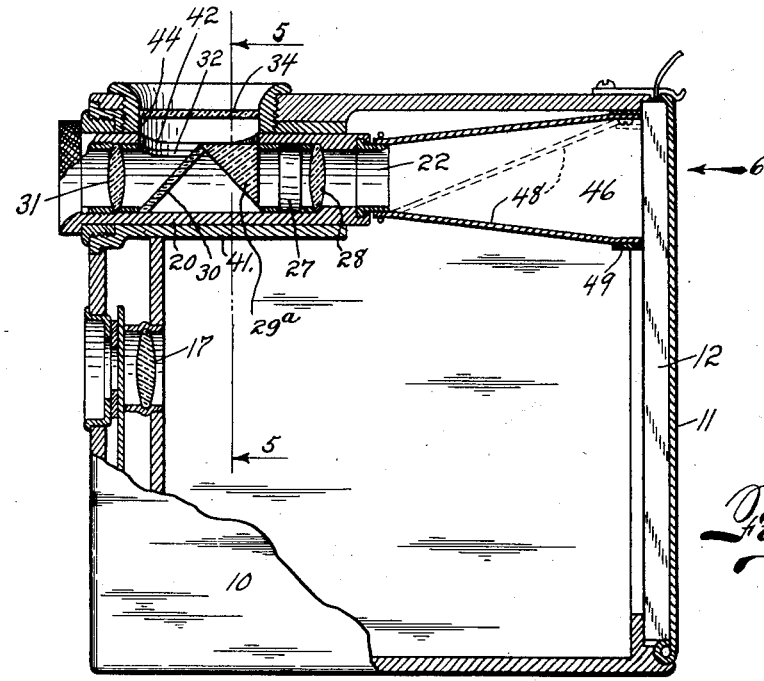
Figure 5:
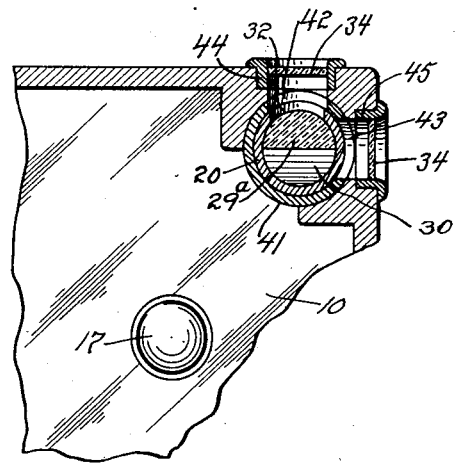
Figure 6:
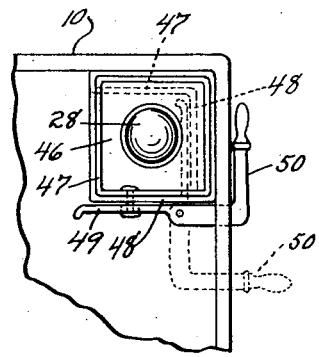
Figure 7:
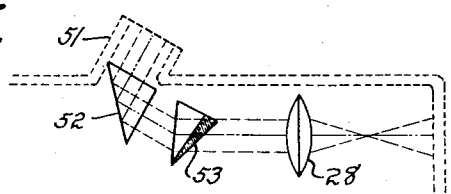

The foregoing and other objects and advantages of the improvements, however, will be so clearly apparent, as incidental to the following disclosure, that it would serve no useful purpose to further enlarge upon the same initially, and with these prefacing remarks, therefore, reference will now be immediately had to the accompanying drawings, illustrating certain practical embodiments of the improvements, in which drawings Figure 1 is a view partly in longitudinal section and partly in side elevation, showing the application of my improvements to a camera of the folding type, employing a film pack or equivalently a plate holder; Figure 2 is a fragmentary view in front elevation looking in the direction of the arrow 2 of Fig. 1; Figure 3 is a fragmentary rear elevational view looking in the direction of the arrow 3 of Fig. 1, and with the film pack and its hinged back support removed; Figure 4 is a view analogous to Fig. 1, but showing the improvements as slightly modified for application to a box camera; Figure 5 is a fragmentary local sectional view, looking in the direction of the arrows on the section line 5—5 of Fig. 4; Figure 6 is a view analogous to Fig. 3 and looking in the direction of the arrow 6 of Fig. 4; and Figure 7 is a diagrammatic view showing conventially the employment of prisms in substitution of mirrors, of which there may be various other arrangements, and also showing an objective opening or tube disposed upwardly and rearwardly from the camera body.

Referring first to Figures 1 to 3, the numeral 10 indicates the casing body of the camera, providing a hinged back supporting plate 11 for the film pack 12, the usual bellows 13, the hinged front wall and base support 14 mounting the sliding upright member 15 for supporting the apex of the bellows, the stop and shutter mechanism 16 and the main objective lense 17, all of which are old and understood.

In carrying out my invention with this type of camera, I provide an auxiliary bellows of comparatively restricted cross-sectional area, which is preferably mounted to one side and at the top of the main camera, and the rear portion 18 of which extends within the main bellows 13, in light-tight association with the film pack or plate holder, while the forward portion 19 projects without the main bellows, as shown at Fig. 1.

The apex end of this auxiliary bellows 18—19 is associated with a rotatably mounted open-ended tube 20, containing certain optical elements as hereinafter referred to, and a convenient although not specifically essential means for rotatably supporting the inner end of said tube 20 is shown by the ferrule-like coupling member 22, secured within the bellows and providing an annular head 23 that is interiorly grooved to receive an annular flange 21 formed on the inner end of the tube 20.

The outer end of the tube 20 is supported to telescope with an auxiliary open-ended shorter tube 24, as an extension compensating means relatively to the focusing movements of the main bellows, which shorter tube 24 may or may not have a pin and slot connection 25 with the tube 20, and which shorter tube as a convenient expedient may be mounted by a properly apertured arm 26 forming an extension of the upright member 15. It is to be understood that the outer end of the tube 20 and the length of the shorter tube 24, as likewise the slot 25 if employed, may be more elongated than would appear at Fig. 1, and if the pin and slot connection 25 is employed, then the tube 24 is to be rotatably mounted by the arm 26. Otherwise, it may either be rotatably or fixedly mounted, but with the end of the tube 20 rotatable thereon.

At the rear end of the tube 20, a little forward of the coupling member 22, there is conventionally shown a shutter casing 27, and the stop opening associated therewith should be of substantially large diameter as compared with some of the smaller stop openings associated with the main shutter 16.

Inside of the tube 20, to the rear of the shutter casing 27, there is mounted a lens 28, and forwardly of the shutter casing 27 there is mounted the mirror 29, which might well be a prism as illustrated at 29$^a$ in Figures 4 and 5. Adjacently forward of the mirror 29, or prism 29$^a$ there is mounted a reversely inclined mirror 30, and forward of this mirror 30 is mounted the lens 31, these optical elements 30—31 forming a part of the finder means common to cameras.

The reflecting surfaces of the mirrors 29—30 are wholly disposed opposite an enlarged aperture 32 in the tube 20, which aperture may be of an elongated or oval shape and is encompassed by a short analogously shaped tubular extension 33, which may have a glass insert plate 34, the forward half of which plate 34 is more particularly associated with the forward mirror 30 of the finder means, while the rear half of the glass plate 34 is above the mirror 29. Obviously, however, the details of the structures just described need not necessarily be exactly identical with the specific disclosure, it being sufficient to understand that the forward mirror 30 is a feature of the finder means, while the rear mirror 29, or prism 29$^a$ is for reflecting the facial image of the photographer, or other object, rearwardly to the sensitized negative vehicle.

As the main and auxiliary bellows are light-tight with reference to each other and the sensitized negative vehicle, it is obvious that their shutter mechanisms 16 and 27 could be operated independently of each other if so desired, but for simultaneous exposures I have shown the usual flexible actuating means 35 leading as at 36 to the main shutter element 16, and having a branch 37 leading to the auxiliary shutter element 27.

Where it is not desirable to use the auxiliary appliance, as when the whole sensitized plate or film is to be exposed to the main view, I have made provision for the collapsing or folding up of the inside and bottom walls of the rear portion 18 of the auxiliary bellows, which when folded upwardly and laterally appear as in dotted outline at Fig. 3.

Any suitable means may be employed for doing this, but as a matter of practical illustration I have shown a swinging rod 38 supporting the rear base of the portion 18, the inner end of which rod is pivotally mounted as at 39 on the camera casing, and is swung in its arc by the operating lever arm 40 from the horizontal to a vertical position, for folding up the rear portion of the auxiliary bellows, and reversely for opening up the same, all of which will be apparent from the full and dotted outlines.

Before proceeding with a detailed description of the remaining figures, the essential features and principles of which are substantially identical with the construction heretofore described, it may not be amiss to first briefly state the functioning and operation of the improvements as shown in Figures 1 to 3.

With the camera focused, as at Fig. 1, the photographer locates the position of the view on the sensitized film by the medium of the finder elements 31—30—34. It will also be obvious that the mirror 29, or prism if employed, will reflect the facial image of the photographer rearwardly in axial line with the auxiliary bellows, so that upon exposures being made by the operation of the shutters, whether made independently or simultaneously, the main view will be projected to the major portion of the sensitized vehicle while the photographer's facial image will analogously be projected to a minor portion thereof, and this whether or not a vignetting feature be employed at the rear for a fading-in merger effect. In view of the fact that the auxiliary objective opening will probably receive much less light than the main objective lens, it will doubtless be desirable that the shutter of the former be actuated at a slower speed than the main shutter. In these illustrations the camera is set to take a picture disposed lengthwise of the plate or film, but when it is desired to take the picture as disposed transversely thereof then the barrel 20 with its optical elements are rotated a quarter turn to the position indicated in dotted lines at Figure 2.

It is to be noted that the extension of the auxiliary bellows is limited and that the barrel 20, being non-extensible with reference to the auxiliary bellows, is likewise limited as to longitudinal movement, so that the mirror 29 or its equivalent is always set at the same adjusted position with reference to the back of the camera, which position is predetermined for the proper focusing of the photographer's facial image on the sensitized negative vehicle. This does not interfere, however, with the further outward adjustment of the main bellows, as compensation is provided for by the mounting of the outer end of the barrel 20 in telescoping relation with the shorter extension tube section 24. As a mater of fact, the actual final adjustment of the main bellows is very slight, as most pictures are taken at a universal focus, but at any event I provide for such final adjustment of the main bellows in either direction without disturbing the predetermined adjustment of the auxiliary bellows or its directly cooperating optical elements.

In Figures 4 to 6, the same parts or substantially the same or equivalent elements, as those heretofore mentioned, have been indicated by the same reference numerals for the sake of clearness and to avoid repetition in description, but being a box camera some slight alterations have to be made.

The tube 20, which may be provided with a milled operating head, is rotatably supported in a bearing sleeve 41, or its equivalent, which bearing sleeve provides a pair of suitably formed apertures 42—43 disposed at right angles to each other and in registration with complementary sighting apertures having encompassing short tubes 44—45 located in the top wall and a side wall of the camera box, so that upon rotating the optical tube or barrel 20 a quarter turn the aperture 32 of the latter will be brought into registration with the tubular openings 44 or 45, respectively, for reasons which will be obvious from the prior description.

In this construction, neither a main or an auxiliary bellows being employed, there is substituted for the aforesaid auxiliary bellows an auxiliary compartment or chamber having collapsible or foldable bottom and inside walls, and the rear end of the tube or optical barrel 20 is rotatably connected to the forward or apex end of this auxiliary collapsible compartment by the coupling element 22.

This forwardly converging or tapering auxiliary compartment, indicated generally at 46, has at least an inside wall 47 and a bottom wall 48 which are collapsible or formed of a foldable fabric, and the bottom wall 48 thereof at its rear end may be supported by a cross rod or bar 49, pivotally mounted and operated by a handle lever 50, analogously to the elements 38—40 before described, whereby this auxiliary compartment may be maintained distended, as shown in full lines, or collapsed and folded up as shown in dotted outline.

The diagrammatic conventional view, Figure 7, is of no real especial importance, but illustrates primarily the use of a prism or prisms, of which there may be varied arrangements, in substitution of the mirror 29 of the other views, and further illustrates a slightly modified disposition of the auxiliary objective opening, to enable the photographer to hold his head back a little when taking his own picture and not necessarily directly over the auxiliary objective opening as in the other views. To this end, a finishing rim 51 for the opening projects upwardly and slightly rearwardly as shown, and 52 designates a prism properly associated therewith, while 53 designates an achromatic prism for bending the rays to properly project same into association with the lens 28. In this view, the finder opening is not shown but would be in advance of the rim 51.

In all instances, however, the particular feature of the invention to be emphasized is that the auxiliary objective opening is disposed rearwardly of the main objective opening, either in a plane above or to one side thereof, and that when the appliance is used at will it permits of the photographing of an auxiliary object together with the main view on a portion of the same negative vehicle, which auxiliary object is located at a position to the rear of the front of the camera.

As the invention more particularly embodies the physical structure of the improvements and the combined arrangement and operation of the elements thereof, it is not thought to be necessary to enumerate specifically the many uses to which it may be put other than those already mentioned, and from the foregoing complete description of the invention it is believed that the utility and full advantages thereof will be clearly apparent, especially to the users of cameras and those engaged in the industry of manufacturing same.

However, while I have thus fully set forth the improvements, it will nevertheless be understood that I do not wish to unnecessarily confine myself to all of the details exactly as disclosed, excepting as they may come within the terms of the ensuing claims, or equivalent elements employed, and as fairly interpreted in the light of the specification if necessary, as it is obvious that minor alterations might be made without departing from the gist of the invention. For instance, in the case of a camera employing a reel or a roll of films, the arrangement and disposition of some of the elements would have to be slightly altered to accommodate the improvements to that particular type of camera, but without at all departing from the spirit of the invention.

What I do claim, as new and patentable, is:—

1. In a camera providing a compartment with a forwardly facing main objective opening and shutter mechanism therefor, the combination of auxiliary optical means associated in light-proof relation with said compartment and also associated with a light-unobstructed objective opening disposed rearwardly of said main objective opening and facing angularly thereto, for projecting light rays towards the rear of said compartment separately from the light rays through said main objective opening, and shutter mechanism associated with said auxiliary optical means.

2. In a camera providing a compartment with a forwardly facing main objective opening and shutter mechanism therefor, the combination of rotatably supported auxiliary optical means associated in light-proof relation with said compartment and also associated with a light-unobstructed objective opening disposed rearwardly of said main objective opening and facing angularly thereto, for projecting light rays towards the rear of said compartment separately from the light rays through said main objective opening, and shutter mechanism associated with said auxiliary optical means.

3. In a camera providing a compartment with a forwardly facing main objective opening and shutter mechanism therefor, the combination of rotatably supported auxiliary optical means associated in light-proof relation with said compartment and also associated with an objective opening disposed rearwardly of said main objective opening and facing angularly thereto, for projecting light rays towards the rear of said compartment separately from the light rays through said main objective opening, shutter mechanism associated with said auxiliary optical means, and finder means supported to rotate with said auxiliary optical means.

4. In a camera providing a main compartment with a forwardly facing main objective opening and shutter mechanism therefor, the combination of an auxiliary compartment extending within said main compartment to the rear thereof and in light-proof relation thereto, optical means associated with said auxiliary compartment and also associated with a light-unobstructed objective opening disposed rearwardly of said main objective opening and facing angularly thereto, for projecting light rays rearwardly through said auxiliary compartment, and shutter mechanism associated with said auxiliary optical means.

5. In a camera providing a main compartment with a forwardly facing main objective opening and shutter mechanism therefor, the combination of an auxiliary compartment extending within said main compartment to the rear thereof and in light-proof relation thereto, rotatably supported optical means associated with said auxiliary compartment and also associated with an objective opening disposed rearwardly of said main objective opening and facing angularly thereto, for projecting light rays through said auxiliary compartment, and shutter mechanism associated with said auxiliary optical means.

6. In a camera providing a main compartment with a forwardly facing main objective opening and shutter mechanism therefor, the combination of an auxiliary compartment extending within said main compartment to the rear thereof and in light-proof relation thereto, rotatably supported optical means associated with said auxiliary compartment and also associated with an objective opening disposed rearwardly of said main objective opening and facing angularly thereto, for projecting light rays through said auxiliary compartment, shutter mechanism associated with said auxiliary optical means, and finder means supported to rotate with said auxiliary optical means.

7. In a camera having a main compartment with a main objective opening and shutter mechanism therefor, the combination of an auxiliary compartment providing collapsible walls extending within said main compartment to the rear thereof and in light-proof relation thereto, optical means associated with said auxiliary compartment and also associated with an objective opening facing in a direction angularly to said main objective opening, for projecting light rays rearwardly through said auxiliary compartment when distended, shutter mechanism associated with said auxiliary optical means, and means for folding up said collapsible walls as desired.

8. In a camera having a main compartment with a main objective opening and shutter mechanism therefor, the combination of an auxiliary compartment providing collapsible walls extending within said main compartment to the rear thereof and in light-proof relation thereto, rotatably supported optical means associated with said auxiliary compartment and also associated with an objective opening facing in a direction angularly to said main objective opening, for projecting light rays rearwardly through said auxiliary compartment when distended, shutter mechanism associated with said auxiliary optical means, and means for folding up said collapsible walls as desired.

9. In a camera having a main compartment with a main objective opening and shutter mechanism therefor, the combination of an auxiliary compartment providing collapsible walls extending within said main compartment to the rear thereof and in light-proof relation thereto, rotatably supported optical means associated with said auxiliary compartment and also associated with an objective opening facing in a direction angularly to said main objective opening, for projecting light rays rearwardly through said auxiliary compartment when distended, shutter mechanism associated with said auxiliary optical means, means for folding up said collapsible walls as desired, and finder means supported to rotate with said auxiliary optical means.

10. In a camera providing a main compartment with a main objective opening and shutter mechanism therefor, the combination of an auxiliary compartment extending within said main compartment to the rear thereof and in light-proof relation thereto, an open-ended barrel rotatably associated with said auxiliary compartment and also associated with an auxiliary objective opening facing in a direction angularly to said main objective opening, a reflecting optical element associated with said auxiliary objective opening for projecting light rays rearwardly through said auxiliary compartment, a lens associated with said reflecting optical element, and shutter mechanism associated with said lens.

11. In a camera providing a main compartment with a main objective opening and shutter mechanism therefor, the combination of an auxiliary compartment extending within said main compartment to the rear thereof and in light-proof relation thereto, an open ended barrel rotatably associated with said auxiliary compartment and also associated with an auxiliary objective opening facing in a direction angularly to said main objective opening, a reflecting optical element associated with said auxiliary objective opening for projecting light rays rearwardly through said auxiliary compartment, a lens associated with said reflecting optical element, shutter mechanism associated with said lens, and finder means mounted by said rotatable barrel.

12. In a camera having a main compartment with a main objective opening and shutter mechanism therefor, the combination of an auxiliary compartment providing collapsible walls extending within said main compartment to the rear thereof and in light-proof relation thereto, an open-ended barrel rotatably associated with said auxiliary compartment and also associated with an auxiliary objective opening facing in a direction angularly to said main objective opening, a reflecting optical element mounted in said barrel and associated with said auxiliary objective opening for projecting light rays rearwardly through said auxiliary compartment when distended, a lens mounted by said barrel in association with said reflecting optical element, shutter mechanism associated with said lens, and means for folding up said collapsible walls as desired.

In testimony whereof, I affix my signature.

EMILE J. VERSCHRAEGHEN.